United States Patent [19]

Jeffrey et al.

[11] Patent Number: 4,735,090
[45] Date of Patent: Apr. 5, 1988

[54] FLANGE MOUNTED PRESSURE TRANSMITTER

[75] Inventors: Michael J. Jeffrey, Newtown, Pa.; Frank A. Osenbach, Cinnaminson, N.J.

[73] Assignee: Honeywell Inc., Minneapolis, Minn.

[21] Appl. No.: 935,906

[22] Filed: Nov. 28, 1986

[51] Int. Cl.⁴ ............................................. G01L 7/08
[52] U.S. Cl. ...................................... 73/706; 73/708; 73/715
[58] Field of Search ................ 73/706, 708, 715, 723, 73/724, 725, 726, 727, 728, 729, 731, 716–722, 732, 755, 756

[56] References Cited

U.S. PATENT DOCUMENTS 2,906,095  9/1959  Whitehead, Jr. ...................... 73/708
3,999,435 12/1976  Siegel ..................................... 73/708
4,646,406  3/1987  Weiss et al. ............................ 73/741

Primary Examiner—Donald O. Woodiel
Attorney, Agent, or Firm—Mitchell J. Halista; Albin Medved

[57] ABSTRACT

A flange mounted pressure transmitter uses a filled assembly having pressure transmitting fill fluid in a sealed capillary extending between a barrier diaphragm exposed to a fluid being monitored and a pressure sensor located in a housing attached to one end of a protective extension tube containing the capillary and supporting the diaphragm at the other end thereof. A gasket ring and a transmitter mounting flange are located on the exterior surface of the protecting tube and are arranged to provide a means for attaching the extension tube to a housing containing the fluid being monitored. The gasket ring is arranged to be welded to the exterior surface of the extension tube at a selectable distance from the barrier diaphragm which is effective to produce a desired location of the extension tube and the diaphragm within the housing containing the fluid being monitored. Subsequently, the mounting flange is attached to the gasket ring and to an exterior surface of the housing surrounding an opening in the housing to provide a fluid-tight mounting of the transmitter on the housing by a gasket carried by the gasket ring and facing the housing and a positioning of the diaphragm within the housing at the desired internal location.

8 Claims, 1 Drawing Sheet

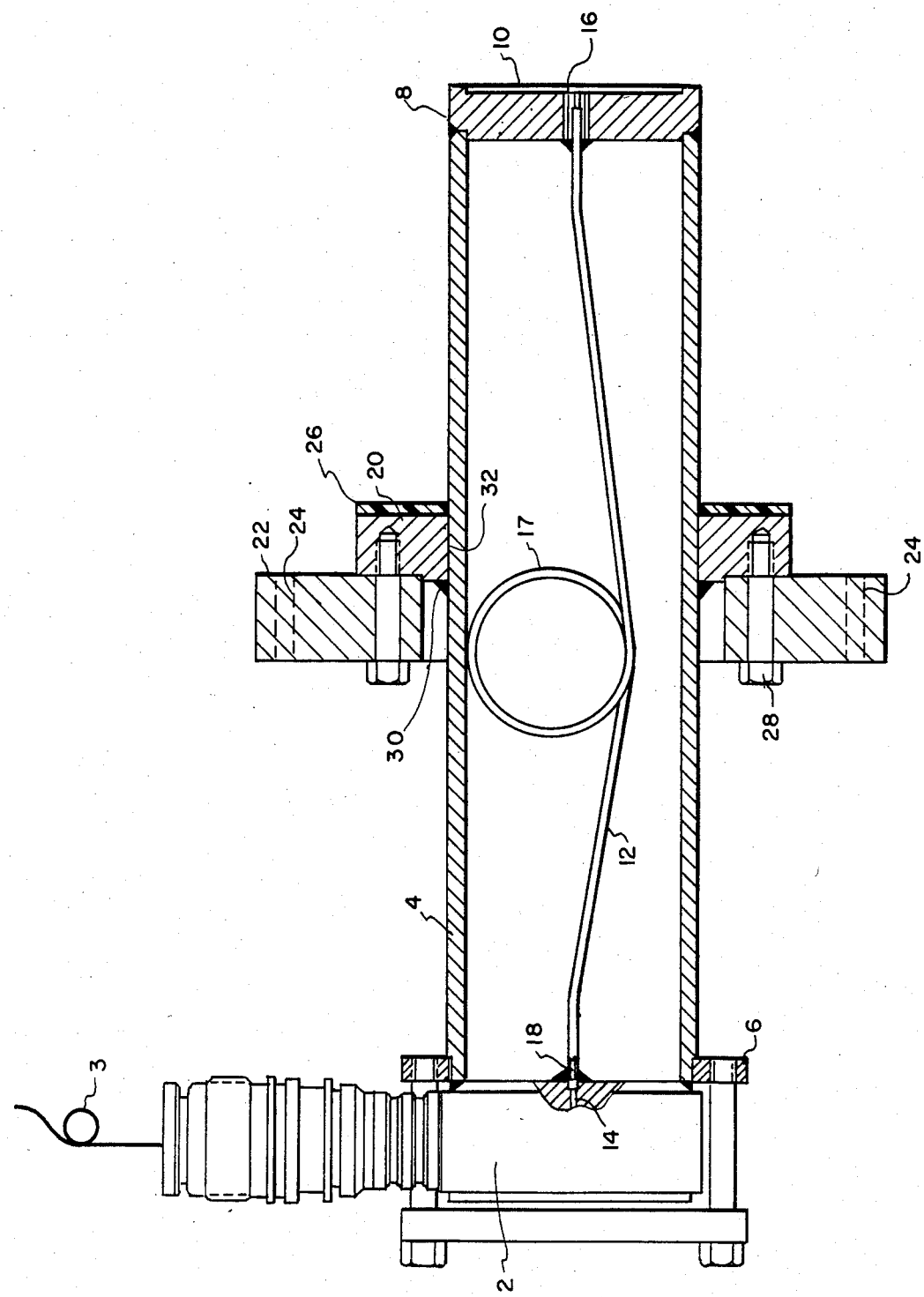

FLANGE MOUNTED PRESSURE TRANSMITTER

BACKGROUND OF THE INVENTION

1. Field of the Invention

The present invention relates to pressure transmitters. More specifically, the present invention is directed to a pressure transmitter using a sealed pressure transmitting system including a barrier diaphragm facing a fluid being monitored.

2. Description of the Prior Art

Pressure transmitters utilizing a pressure sensor, e.g., a semiconductor chip, arranged in a sealed fill fluid system with a barrier diaphragm facing a fluid being monitored are well-known in the art, e.g., the differential pressure transmitter shown in U.S. Pat. No. 3,559,488. In order to facilitate the connection of such a pressure transmitter to a fluid being monitored the use of a remote connection between the barrier diaphragm at the fluid being monitored and the pressure sensor has used a fluid filled capillary transmitting the pressure from the barrier diaphragm to the sensor, e.g., the pressure transmitter shown in U.S. Pat. Nos. 2,906,095 and 3,999,435. However, in those differential pressure transmitters there was no provision for enabling the barrier diaphragm to be selectively positioned within a container or housing containing the fluid being monitored whereby the barrier diaphragm is located at a desired location with respect to the internal wall surface of the container containing the monitored fluid, e.g., flush with the internal wall surface. In order to provide such a capability in a limited fashion the pressure transmitter has been supplied with a barrier diaphragm located on one end of a projecting tube with a pressure transmitter and a mounting flange attached to the other and of the tube. By providing a plurality of different lengths of the tube between the attached transmitter and the flange, the corresponding location of the diaphragm in the container containing the fluid being monitored is achieved. However, such a structure has necessitated the manufacture, storage and use of a plurality of pressure transmitters with corresponding tube lengths to satisfy the various requirements of the industry for the location of the barrier in the monitored fluid. Accordingly, in order to provide a universal and adaptable pressure transmitter capable of affording an infinite number of tube lengths for selectively locating the barrier diaphragm in the fluid, it is desirable to provide a pressure transmitter having a selectively variable location of the diaphragm with respect to the mounting flange at a distanc defining the location of the barrier diaphragm in the monitored fluid.

SUMMARY OF THE INVENTION

An object of the present invention is to provide an improved pressure transmitter having a selectively variable position of a barrier diaphragm with respect to a mounting flange for the transmitter on a container of a monitored fluid.

In accomplishing this and other objects, there has been provided, in accordance with the present invention a pressure transmitter having a sealed pressure transmitting system including a capillary extending between a barrier diaphragm and a pressure sensor, an extension tube extending between the barrier diaphragm and a housing for the pressure sensor and a gasket ring and flange means for attaching the tube to a container for a fluid to be monitored by the transmitter with the means being arranged to be selectively positionable on the external surface of the tube and to be selectively attached in a fluid-tight manner thereto.

BRIEF DESCRIPTION OF THE DRAWING

A better understanding of the present invention may be had when the following detailed description is read in connection with the accompanying drawing, in which the single figure is a cross-sectional illustration of a pressure transmitter embodying an example of the present invention.

DESCRIPTION OF THE PREFERRED EMBODIMENT

Referring to the figure of the drawing in more detail, there is shown a pressure transmitter having a pressure sensor housing 2 containing a pressure sensor element (not shown) to provide an electrical representation on a connecting wire 3 of a sensed pressure in a manner well-known in the art. The pressure housing 2 is connected in a fluid-tight manner, e.g., by welding, to a first end of a protective extension tube 4. The other end of the tube 4 is connected also in a fluid-tight manner, e.g., by welding, to a barrier diaphragm support plate 8 having a barrier diaphragm 10 attached at its periphery in a fluid-tight manner to the support plate 8. A fluid filled capillary 12 is connected between an internal volume 14 of the housing 2 and a chamber 16 located in the support plate 8 behind the barrier diaphragm 10 to provide a fluid-tight connection therebetween. The capillary 12 includes a loop 17 located in the capillary 12 to provide a temperature compensation section in the capillary 12. A fill fluid 18 is arranged within the capillary 12, and the spaces in chambers 14,16 to provide a fluid pressure transmitting means between the barrier diaphragm and the sensor located in the housing 2.

A gasket ring 20 is located on an outer surface of the tube 4 and is selectively attachable to the tube 4 to provide a fluid-tight seal thereto, e.g., by welding the ring 20 to the tube 4. A mounting flange 22 is attached to the ring 20 and is radially spaced from the protecting tube 4. The flange 22 includes holes 24 therein near the periphery of the flange 22 for attaching the flange 22 to the side of a container, e.g., on a container spud, containing the fluid being monitored by the pressure transmitter. The gasket ring 20 may be operatively associated with a sealing gasket 26 located on a face of the ring 20 opposite to the face of ring 20 contacting the flange 22 to enable the gasket ring 20 to be sealed in a fluid-tight manner to the container containing the fluid being monitored.

In operation, the pressure transmitter of the present invention is effective to transmit the pressure applied to the barrier diaphragm 10 through the capillary 12 to the sensor in the sensor housing 2. In order to accommodate a desired location of the barrier diaphragm 10 in the housing of the fluid being monitored, the ring 20 is selectively positioned on the tube 4 to determine the length of the tube 4 needed for the particular housing containing the monitored fluid. Specifically, the flange 22 is first slipped onto the protecting tube 4, and the ring 20 is then positioned at the preselected position on the tube 4. Subsequently, the ring 20 is welded, e.g., by a locating weld bead 30 and by a seal weld 32, e.g., a fusion weld, to produce a fluid-tight connection to the external surface of the protecting tube 4 at the preselected position which provides the desired location of the barrier diaphragm 10 in the monitored fluid. The flange 22 is then attached to the ring 20 by any suitable attaching means, e.g., bolts 28 extending through the flange 22 into the ring 20. Finally, the mounting flange 22 is attached to the outer surface of the housing of the monitored fluid to provide a fluid-tight seal thereto by means of the gasket 26 while positioning the barrier diaphragm 10 within the fluid housing at the desired location on the internal wall surface of the fluid housing.

Accordingly, it may be seen, that there has been provided, in accordance with the present invention an improved pressure transmitter affording a selectable mounting position for the pressure transmitter on a container for the fluid being monitored to produce a desired location of a barrier within the container.

The embodiments of the present invention in which an exclusive property or privilege is claimed are defined as follows:

1. A pressure transmitter comprising
   a pressure sensor means,
   a housing for said sensor means,
   a barrier diaphragm means,
   a fluid capillary extending between said barrier diaphragm means and said housing,
   a protective extension tube containing said capillary and extending between said barrier diaphragm means and said housing and
   a gasket ring and flange means for attaching said tube to a container for a fluid to be monitored by the transmitter, said rings and flange means encircling said tube and arranged to be selectively longitudinally positionable on an external surface of said protective tube with respect to said barrier diaphragm means and including a gasket ring facing the container to be selectively attached in a fluid-tight manner to said external surface after the positioning of said ring and flange means on said tube.

2. A pressure transmitter as set forth in claim 1 wherein said capillary includes a loop within said tube for temperature compensation of said capillary.

3. A pressure transmitter as set forth in claim 1 wherein said ring has a sliding fit on the external surface of said tube prior to the fluid-tight attachment thereto.

4. A pressure transmitter as set forth in claim 3 wherein said ring and flange means includes a gasket arranged to be supported on a surface of said ring facing the container for a fluid to be monitored to provide a fluid-tight seal thereto.

5. A pressure transmitter as set forth in claim 3 wherein said ring and flange means includes a flange radially spaced from said tube and means for connecting said flange to said ring.

6. A pressure transmitter as set forth in claim 4 wherein said means for connecting includes a plurality of bolts extending between said flange and said ring and located radially inwardly of an outer periphery of said ring.

7. A pressure transmitter as set forth in claim 4 wherein said flange has a larger diameter than said ring and includes holes therethrough located radially outwardly of said ring for accepting bolts for attaching said flange to the container for a fluid being monitored.

8. A pressure transmitter as set forth in claim 3 wherein connections between said capillary and said housing and between said capillary and said barrier diaphragm means and between said ring and said tube are welded junctions.

* * * * *